(12) United States Patent
Singh et al.

(10) Patent No.: US 8,886,834 B2
(45) Date of Patent: Nov. 11, 2014

(54) HOT STANDBY NEIGHBOR DISCOVERY PROTOCOL FOR INTERNET PROTOCOL VERSION 6

(75) Inventors: Hemant Singh, Westford, MA (US); William Beebee, Lowell, MA (US); Madhu Sudan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 460 days.

(21) Appl. No.: 12/967,387

(22) Filed: Dec. 14, 2010

(65) Prior Publication Data

US 2012/0151085 A1 Jun. 14, 2012

(51) Int. Cl.
*G06F 15/16* (2006.01)
*H04L 12/66* (2006.01)
*H04L 12/751* (2013.01)
*H04L 12/24* (2006.01)
*H04L 29/08* (2006.01)
*H04L 29/14* (2006.01)

(52) U.S. Cl.
CPC ............... *H04L 12/66* (2013.01); *H04L 45/02* (2013.01); *H04L 41/0663* (2013.01); *H04L 67/145* (2013.01); *H04L 69/40* (2013.01); *H04L 67/142* (2013.01)
USPC ........................................................ 709/245

(58) Field of Classification Search
CPC ............ H04L 61/6059; H04L 61/6086; H04L 69/167; H04L 61/251; H04L 29/06142; H04L 29/12358; H04L 29/12915; H04L 29/12971; H04L 45/741; H04L 45/02
USPC ............ 709/245; 711/212, 202; 712/208–210
See application file for complete search history.

(56) References Cited

U.S. PATENT DOCUMENTS

| 2004/0120355 A1 * | 6/2004 | Kwiatkowski ................ 370/506 |
| 2007/0083638 A1 * | 4/2007 | Pinkerton et al. ............. 709/224 |
| 2007/0099649 A1 * | 5/2007 | Han et al. ...................... 455/525 |
| 2007/0254661 A1 * | 11/2007 | Chowdhury et al. ......... 455/436 |
| 2008/0076419 A1 * | 3/2008 | Khetawat et al. .......... 455/435.1 |
| 2008/0130648 A1 * | 6/2008 | Ra et al. ........................ 370/392 |
| 2010/0325257 A1 * | 12/2010 | Goel et al. .................... 709/223 |

OTHER PUBLICATIONS

Jeff Doyle—CCIE No. 1919, Jennifer Carroll—CCIE No. 1402, CCIE Professional Development Routing TCP/IP, vol. I, Second Edition, Oct. 19, 2005, Cisco Press (15 pages).
IPv6 Extension Headers Review and Considerations, Oct. 2006, Cisco Systems, Inc., pp. 1-12.
Narten et al., Neighbor Discovery for IP version 6 (IPv6), Network Working Group, Standards Track, Sep. 2007 (98 pages).

* cited by examiner

*Primary Examiner* — Joseph E Avellino
*Assistant Examiner* — Deforrest Bailey
(74) *Attorney, Agent, or Firm* — Edell, Shapiro & Finnan, LLC

(57) ABSTRACT

Techniques are provided herein for receiving synchronization messages at a second network device that is in a hot standby configuration from a first network device that is maintaining Internet Protocol version 6 (IPv6) state machines for one or more neighbor devices. The synchronization messages are configured to indicate an IPv6 state for each state machine maintained in the first network device. An IPv6 state for corresponding state machines is updated in the second network device based on the synchronization messages such that the IPv6 states in the second network device allows the second network device to actively process IPv6 traffic for the one or more neighbor devices upon traffic switchover from the first network device to the second network device without restarting the corresponding IPv6 state machine associated with each of the one or more neighbor devices in the second network device. The roles of the first and second device with respect to active and standby state are reversed after a switchover.

17 Claims, 6 Drawing Sheets

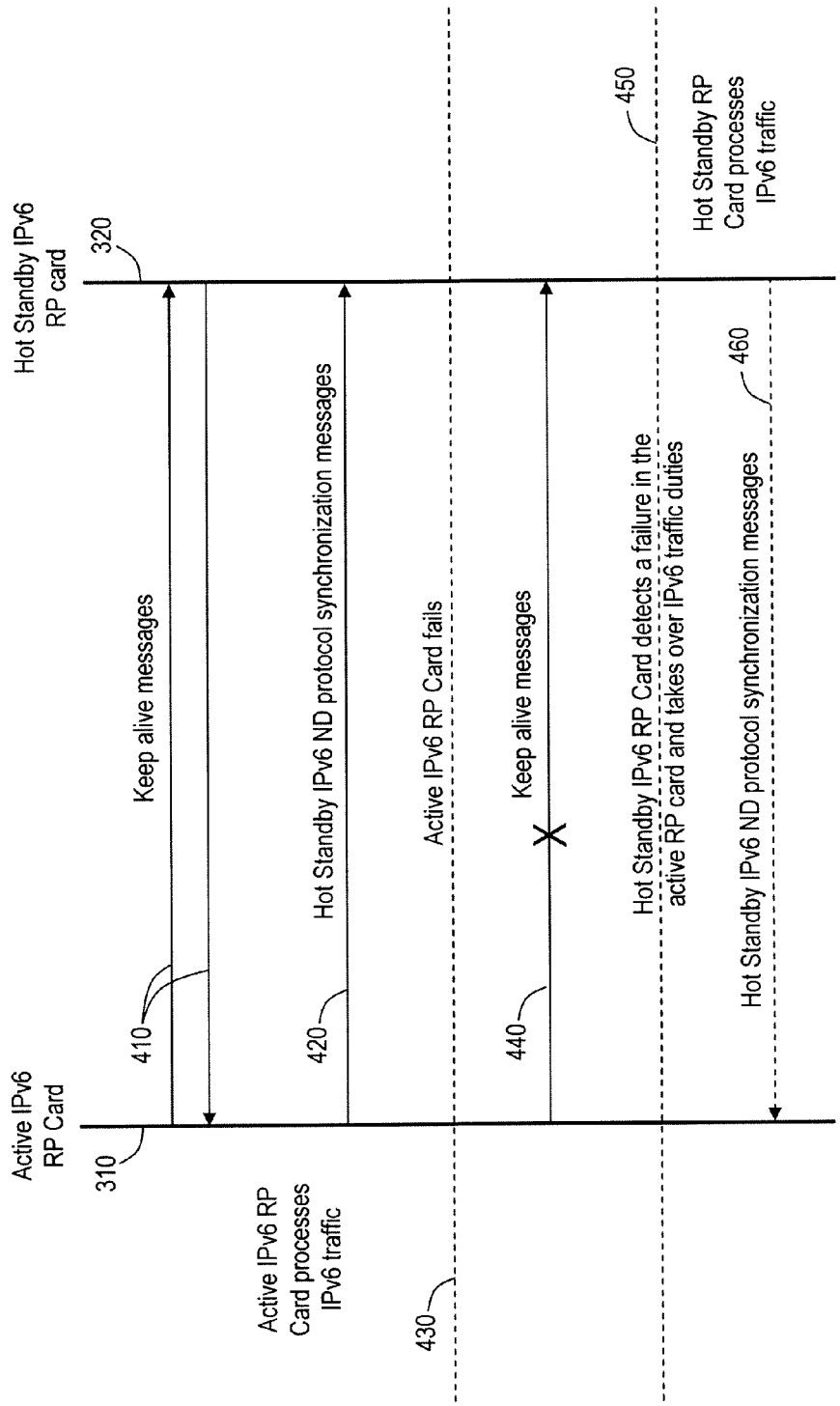

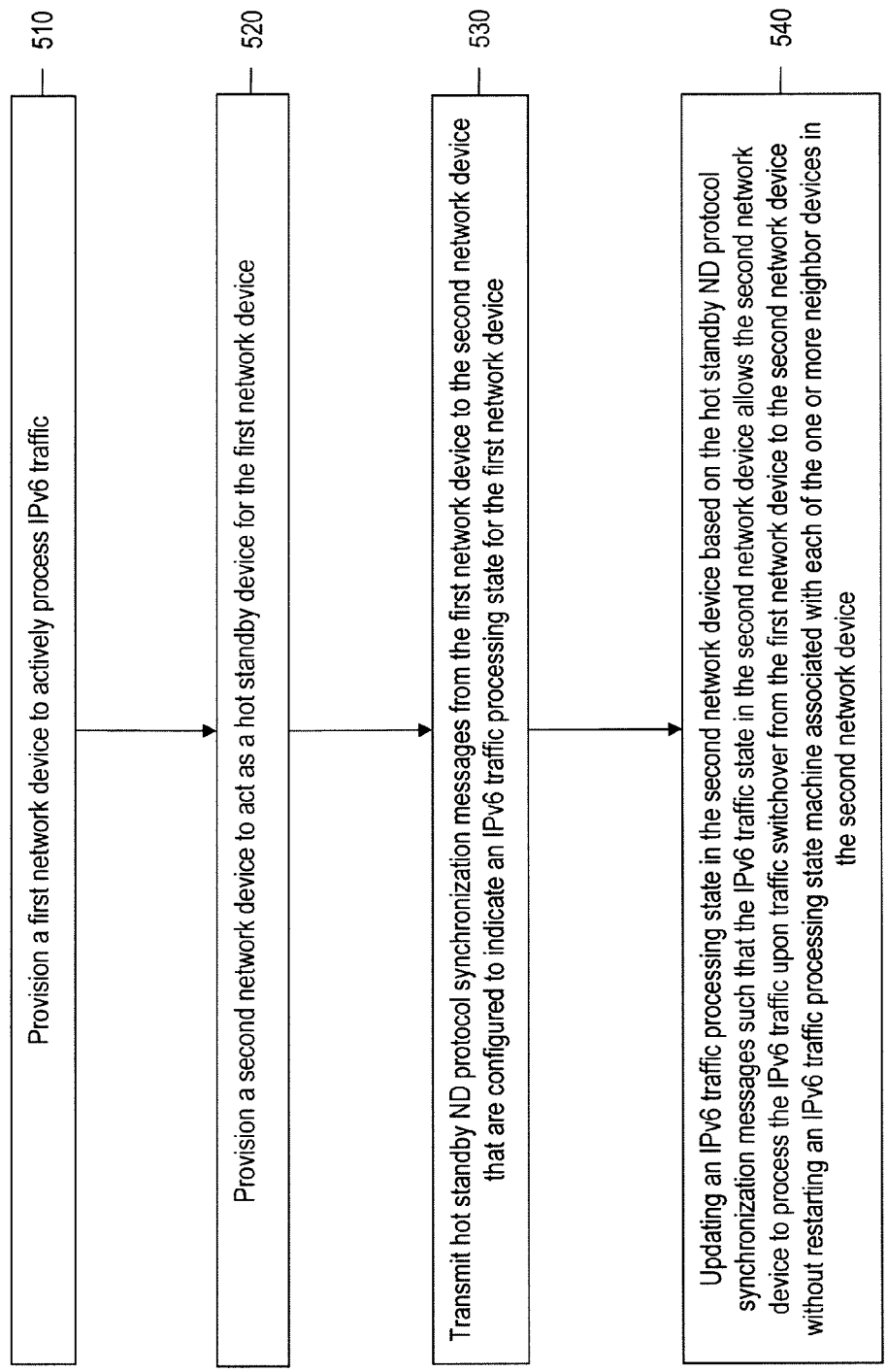

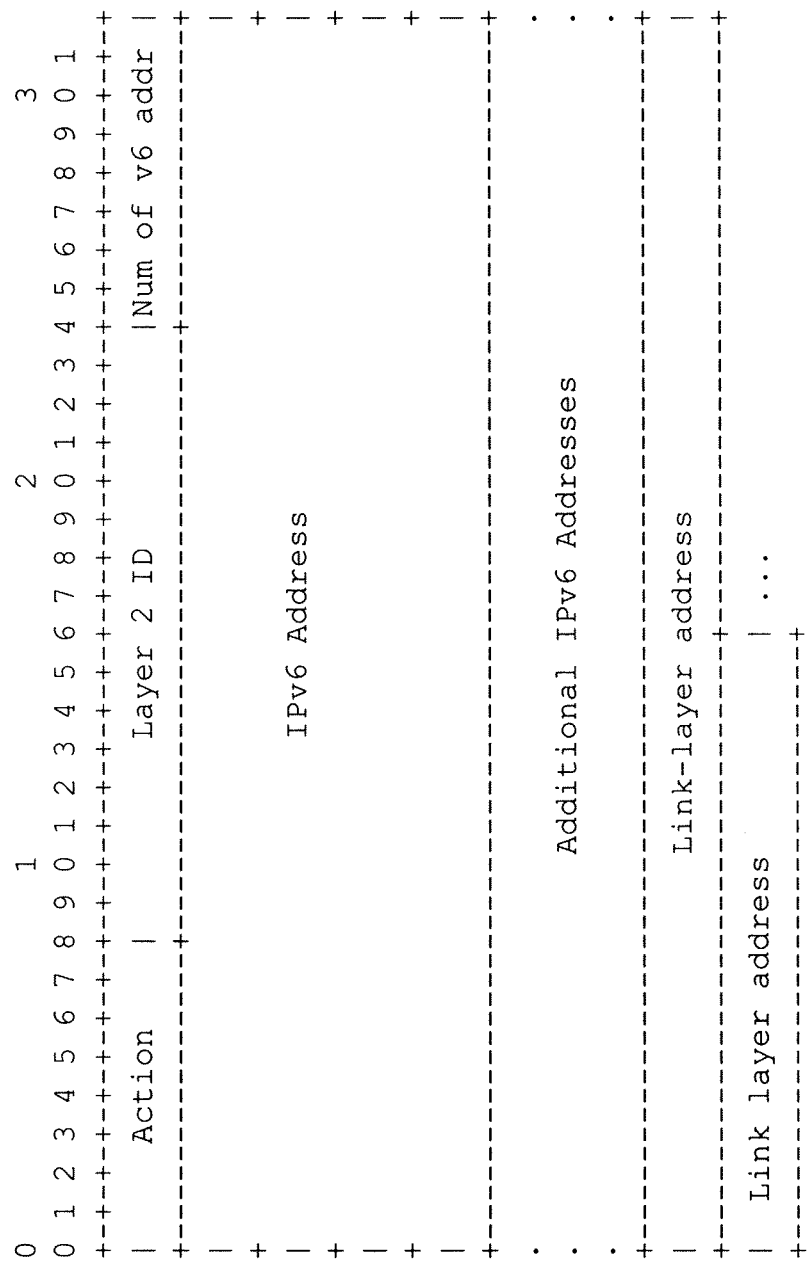

US 8,886,834 B2

HOT STANDBY NEIGHBOR DISCOVERY PROTOCOL FOR INTERNET PROTOCOL VERSION 6

TECHNICAL FIELD

The present disclosure relates generally to the protocol of Neighbor Discovery (ND) for IPv6, and more specifically to timely switchover to a hot standby network device upon failure of a primary network device.

BACKGROUND

Since IPv4 address space depletion is rapidly approaching, many Internet Service Providers (ISPs) are beginning IPv6 deployment. An IPv4 address has 32-bits, whereas an IPv6 address has 128-bits. When sending IP packets, e.g., over Ethernet, the Ethernet or link layer at the source does not "know" the hardware address of the destination. IPv4 uses Address Resolution Protocol (ARP) to allow the source to discover a destination hardware address when only its IP address is known. Once the hardware address is known, IP packets can be transmitted over Ethernet to the destination. The source stores the hardware address in a cache. Since destinations may go off line from time to time without notice, the source discards the hardware address after a period of time and sends another ARP request, if necessary.

ND is an IPv6 protocol that is similar to ARP, but provides a richer set of features. For example, in addition to address resolution, ND allows a host or source to discover attached routers or link parameters, e.g., a link Maximum Transmission Unit (MTU), through a variety of message types. ND, unlike ARP, actively maintains a list of currently bi-directionally reachable neighbors through a process known as Neighbor Unreachability Detection (NUD). NUD confirms bi-directionally reachability via positive confirmation mechanisms. In one example, NUD uses a request, e.g., a unicast Neighbor Solicitation (NS) followed by an acknowledgement, e.g., a unicast Neighbor Advertisement (NA) that confirms round trip connectivity.

BRIEF DESCRIPTION OF THE DRAWINGS

The features and advantages of Hot Standby Neighbor Discovery Protocol (HSNDP) for IPv6 of the present disclosure will become apparent upon consideration of the following description of example embodiments thereof, particularly when taken in conjunction with the accompanying drawings wherein like reference numerals in the various figures are utilized to designate like components.

FIG. 4 is an example ladder diagram illustrating the manner in which an active and standby Router Processor (RP) cards communicate when employing the HSNDP process.

FIG. 5 is an example procedural flowchart illustrating the manner in which the HSNDP process may be implemented.

FIG. 6 depicts an example synchronization message that may be employed by the HSNDP process.

DESCRIPTION OF EXAMPLE EMBODIMENTS

Overview

Techniques are provided herein for receiving synchronization messages at a second network device that is in a hot standby configuration from a first network device that is maintaining Internet Protocol version 6 (IPv6) state machines for one or more neighbor devices. The synchronization messages are configured to indicate an IPv6 state for each state machine maintained in the first network device. An IPv6 state for corresponding state machines is updated in the second network device based on the synchronization messages such that the IPv6 states in the second network device allows the second network device to actively process IPv6 traffic for the one or more neighbor devices upon traffic switchover from the first network device to the second network device without restarting the corresponding IPv6 state machine associated with each of the one or more neighbor devices in the second network device.

The roles of the first and second device with respect to active and standby state are reversed after a switchover. Techniques are also provided herein for the second network device to transmit synchronization messages to the first network device, whereby the first network device synchronizes an IPv6 traffic processing state with the second network device in a similar manner to that described above.

Example Embodiments

Figure 1:
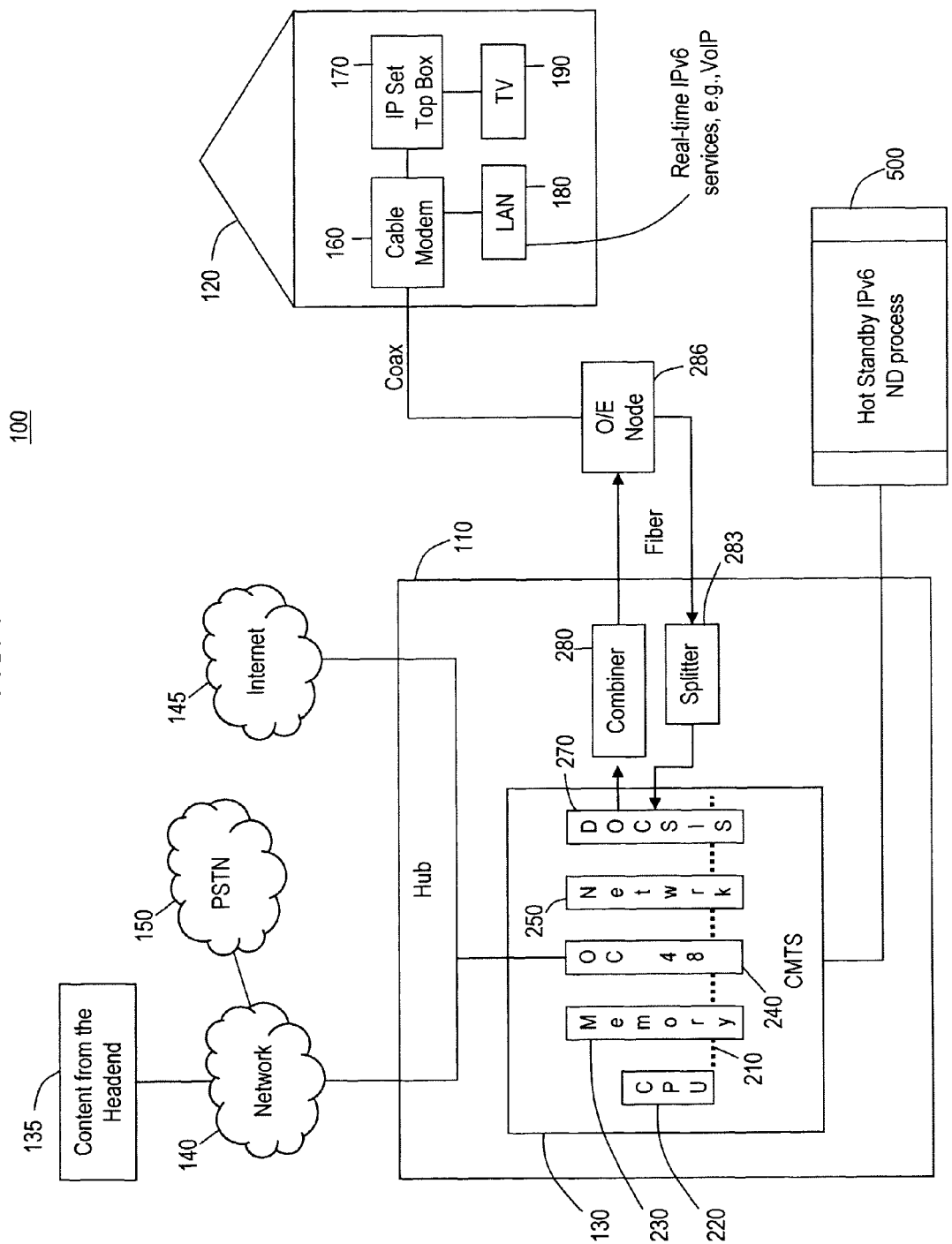
FIG. 1 is an example block diagram of a portion of a cable television distribution system employing an HSNDP process.

Referring first to FIG. 1, relevant portions of an example cable system or network 100 is shown that employs an HSNDP process 500. Specifically, system 100 includes a hub 110 and a customer premise 120. Hub 110 houses a CMTS 130 that is configured to implement the HSNDP process 500. The hub 110 is connected to various content providers for providing media content (e.g., movies, television channels, etc.) via a headend facility (HEF) 135. The media content is distributed by HEF 135 to hub 110 via network 140, e.g., a synchronous optical network (SONET), synchronous digital hierarchy (SDH) network, or IP network. The content is further distributed by hub 110 to the customer premise 120 in the form of conventional digital video or IP television.

In this example, customer premise 120 further houses a cable modem (CM) 160, an IP set top box 170 coupled to CM 160, a television (TV) 190 coupled to IP set top box 170, and a Local Area Network (LAN) 180. In one example, the CM 160 acts as a bridge between the cable network and the home network for providing data services (e.g., Internet, telephony, IP television services, etc.). The LAN 180 may connect to other wired/wireless devices (e.g., personal computers (PCs) or personal data assistants (PDAs), etc.) and may serve as a gateway or access point through which additional PCs or consumer devices have access to data network facilities and Internet Protocol television services, e.g., an IP telephone for real-time Voice over IP (VoIP) voice and video services. IP set top box 170 receives media content over IP and de-encapsulates the media content. IP set top box 170 further decrypts and decodes the media content to produce analog video (e.g., component video, composite video, etc.) and analog audio, or digital video/audio (e.g., digital video interface (DVI) signals) for transmission to TV 190.

Hub 110 further contains a combiner 280 and a splitter 283. The combiner 280 combines various analog and digital signals for transport to customer premise 120 via an optical/electrical (O/E) node 286. The splitter 283 splits the signal coming from O/E node 286 into various components. O/E node 286 communicates via optical fiber to hub 110 and via coaxial (coax) cable to customer premise 120 in a hybrid fiber coax (HFC) network. O/E node 286 may reside anywhere between hub 110 and customer premise 120, or alternatively, coax may connect hub 110 to customer premise 120 without using optical fiber.

Hub 110 may also be connected to the Internet 145 and public switched telephone network (PSTN) 150 for providing Internet and telephony services (e.g., to and from customer premise 120). Media content may also be distributed by content providers via Internet 145. Although only one customer premise 120 and one hub 110 are shown, system 100 may have a plurality of customers and hubs that may also have a CMTS that implements the HSNDP process or module 500. The HSNDP process 500 will generally be described in connection with FIGS. 2-4 and in greater detail in connection with FIG. 5. Briefly, the HSNDP process 500 allows timely and relatively seamless switchover between active or primary IPv6 network components, and redundant standby or back up IPv6 network components.

The CMTS 120 is used to provide high speed data services including cable Internet, voice over IP (VoIP), and Internet Protocol television services to various subscribers, e.g., CP 120. CMTS 120 comprises a central processing unit (CPU) or data processing device 220 and a memory unit 230. The CMTS 120 may also house an optical carrier unit 240, Ethernet unit 250, and a DOCSIS unit 270. Memory unit 220 stores data and/or software or processor instructions that are executed to support the embodiments of the techniques described herein, e.g., for implementing switching functions of the HSNDP process 500.

Units 220-270 may be circuit or line cards with embedded software or firmware that plug into a common chassis and communicate over a common bus 210 (e.g., a peripheral component interconnect (PCI) bus), or units 220-270 may be implemented by any conventional or other computer systems preferably equipped with a processor, memories and/or internal or external communications devices (e.g., modems, network cards, etc.).

The firmware or software for units 220-270 may be updated locally or remotely using various networking components. In addition, the software for the techniques described herein (e.g., for process 500, etc.) may be available on a recordable medium (e.g., magnetic, optical, floppy, DVD, CD, etc.), or in the form available for downloading from a source via a communication medium (e.g., bulletin board, network, WAN, LAN, Intranet, Internet, File Transfer Protocol (FTP) server, etc.).

Optical carrier unit 240 may communicate with HEF 135 over network 140 or Internet 145 using one of various SONET, SDH, or other protocols, such as OC-48 or OC-192 (in the U.S. and Canada), and STM-16 or STM-64 (outside of the U.S. and Canada). Ethernet unit 250 is used for communication with local networking components (not shown). DOCSIS unit 270 is the CMTS 130 interface to CM 160 for digital data signals communicated between CMTS 130 and both the IP set top box 170 and LAN 180.

Figure 2:
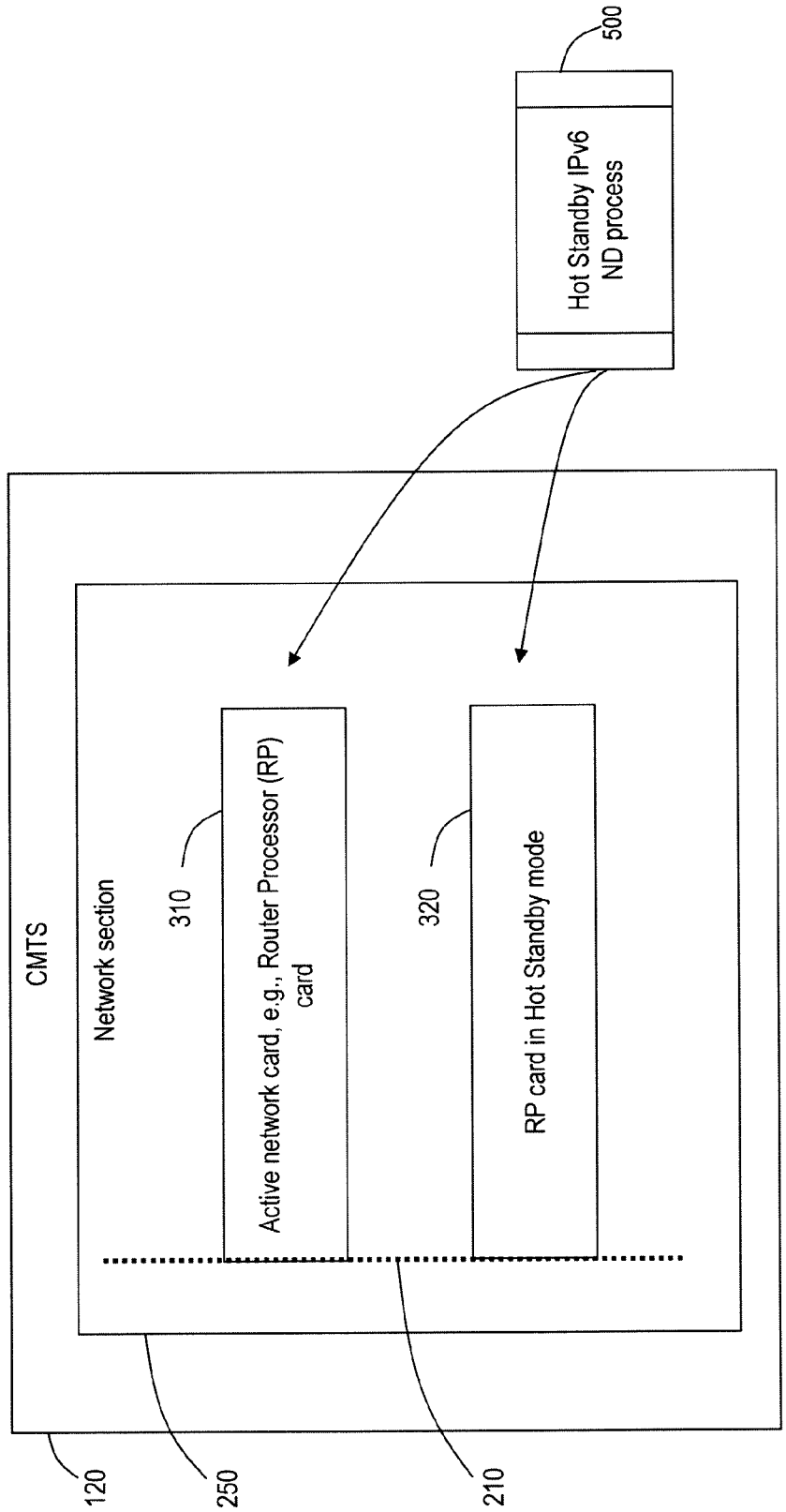
FIG. 2 is an example block diagram of a network section of a cable modem termination system (CMTS) networking section that is configured to employ the HSNDP process.

Referring now to FIG. 2, the network section 250 of CMTS 120 from FIG. 1 is shown that is configured to employ the HSNDP process 500. The network section 250 has two Route Processor (RP) cards 310 and 320, each of which is provisioned with the HSNDP process 500. The RP cards 310 and 320 are coupled by bus or backplane 210 described above. In this example, the RP card 310 is configured as a primary or active card for processing IPv6 traffic control information, and the RP card 320 is configured as a secondary RP card in hot standby mode for a redundancy scheme known in some implementations as High Availability (HA). Each of the RP cards 310 and 320 may have one or more associated line cards that actually forward the IP traffic to various destinations, e.g., to CM 160.

When used herein, the term "node" refers to an RP card on an IPv6 router or the router itself, the term "active node" refers to the node that is currently forwarding IPv6 packets for the redundant system, and the term "standby node" refers to the backup node that is configured to be in a state that will forward IPv6 packets if the active node goes down.

As part of ND, the RPs create and update host entries in a Neighbor Cache (as defined in RFC 4861) or database that is associated with a data table known as a Forwarding Information Base (FIB) or the Destination Cache as specified by Internet Engineering Task Force (IETF) Request For Comments (RFC) 4861. The FIB allows a "fast" lookup of the destination addresses. The FIB may also take the form of a Distributed FIB (DFIB) in which the FIB or parts of the FIB may be stored on other devices. In one example implementation using DFIB, not only does the RP card maintain a FIB, but each line card in the router chassis maintains a FIB as well. Since each line card has its own FIB, each line card may implement a feature known as Non-Stop Forwarding (NSF). With NSF, each line card can continue forwarding IPv6 traffic even when its associated RP card fails.

ND for IPv6 is also specified by RFC 4861. ND maintains a state machine with six states and associated timers for each entry in the Neighbor Cache. In contrast, for entries in the ARP cache, ARP maintains a binary state of INCOMPLETE or COMPLETE along with a single aging timer. The operation of the ND state machine will be described below along with the detailed description of the HSNDP process 500 (FIG. 5). In addition, ND specifies the feature of Neighbor Unreachability Detection (NUD), as mentioned above. NUD is a maintenance mechanism that periodically ensures the reachability of neighbors using unicast Neighbor Solicitation and Neighbor Advertisement packets.

As shown in FIG. 2, the active RP card 310 and hot standby RP card 320 can communicate over backplane 210 of the router chassis. As such, the RP cards 310 and 320 can monitor each other and the active RP 310 can send messages to the standby RP 320 so that RP 320 can maintain a Neighbor Cache and FIB similar to that of RP 310 in the event that active RP 310 fails. In order to provide a smooth switchover from active to standby, a high availability protocol may be used within the CMTS. In one example, Hot Standby CMTS-CMTS Protocol (HCCP) may be used. HCCP also maintains a simple state diagram comprising four states: ACTIVE, STANDBY, BECOMING_ACTIVE, and BECOMING_STANDBY. Redundant hardware within the CMTS (for intra-CMTS redundancy) or between CMTSs (for inter-CMTS redundancy) combined with HCCP forms a base HA subsystem on the CMTS or between two CMTSs. HSNDP runs over such a HA subsystem.

In the ACTIVE state, the active RP or node is actively forwarding IPv6 traffic. In the STANDBY state, the standby node is not forwarding any IPv6 traffic, but is ready to do so should the active node go down. In the BECOMING_ACTIVE state the standby node is transitioning from the STANDBY to ACTIVE state. In the BECOMING_STANDBY the active node is transitioning from the ACTIVE to STANDBY state. When transitioning from active to standby, the state transitions are ACTIVE->BECOMING_STANDBY->STANDBY, and when transitioning from standby to active, the state transitions are STANDBY->BECOMING_ACTIVE->ACTIVE. For simplicity, these state transitions will be abbreviated ACTIVE->STANDBY and STANDBY->ACTIVE, respectively.

Switching from an active node to a standby node, i.e., failover, may be triggered, e.g., by an active node failure, physical removal of an active RP from the RP's chassis, or a command from a Command Line Interface (CLI), for example. Other HA implementations may be used for the CMTS 120 or when the standby RP is housed in a different chassis, e.g., another CMTS. Thus, HA mechanisms are available when the RP cards are part of the same or different devices.

One issue that arises during RP failover is the NUD mechanism's response to the switchover. Due to the mechanisms implemented for NUD, an ND ReachableTime timeout may occur in the standby RP card as the card is going active, e.g., RP card 320. If the ND ReachableTime timeout occurs, the design response is to flush the Neighbor Cache entries. As a result, the ND entries must be rebuilt starting from an empty Neighbor Cache, which may take up to 10 minutes, e.g., when 100,000 ND clients are ready for discovery. When providing real-time services to a customer, e.g., VoIP telephony, 10 minutes is too long to wait during an active phone call, and can result in dropped calls. This is especially problematic for emergency E911 phone calls. By virtue of the HSNDP process 500, the time to initiate traffic forwarding by the standby card can be reduced to less than about three seconds.

Figure 3:
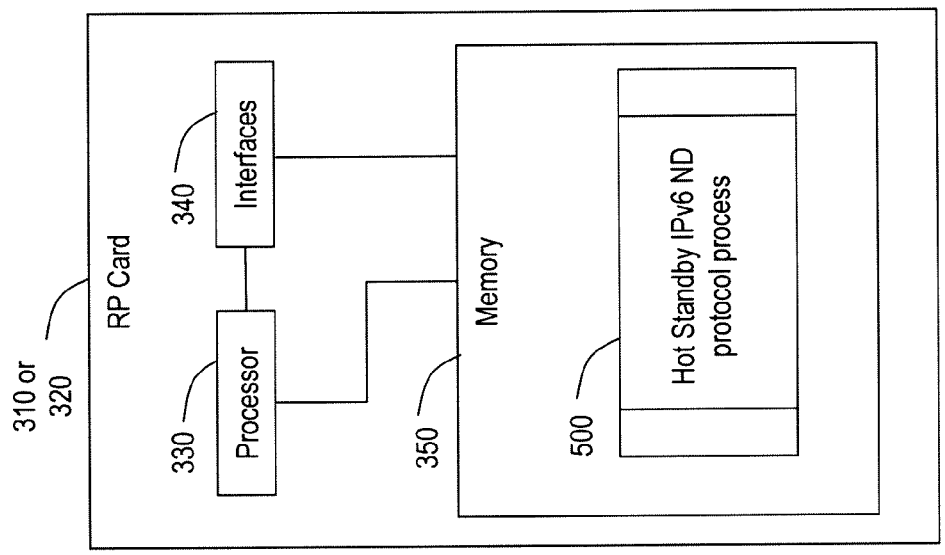
FIG. 3 is an example block diagram of a route processing card that is configured to employ the HSNDP process.

Referring now to FIG. 3, an RP card, e.g., active RP card 310 or hot standby RP card 320 is shown. The RP card has a processor 330, a plurality of interfaces 340, and a memory 350. The plurality of interfaces 340 are generalized for ease of description and may comprise backplane interfaces that communicate using various protocols, e.g., Ethernet or HCCP, as described above. The interfaces 340 may also comprise other non-specific or specific interfaces, e.g., a front panel diagnostic or maintenance port. The memory 350 is configured to store instructions for the HSNDP process 500. In other implementations the logic for process 500 may be incorporated into firmware or hardware, e.g., in an ASIC. Alternatively, process 500 may be implemented as a combination of software and hardware.

The processor 330 is, for example, a microprocessor, a microcontroller, systems on a chip (SOCs), or other fixed or programmable logic. The memory 350 may be any form of random access memory (RAM) or other tangible (non-transitory) memory media that stores data or instructions used for the techniques described herein. The memory 350 may be separate or part of the processor 330. Instructions for performing the HSNDP process 500 may be stored in the memory 350 for execution by the processor 330 such that when executed by the processor, causes the processor to perform the operations describe herein in connection with FIGS. 4 and 5.

The functions of the processor 330 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 350 stores data used for the computations or functions described herein (and/or to store software or processor instructions that are executed to carry out the computations or functions described herein). Thus, functions of the HSNDP process 500 may be implemented with fixed logic or programmable logic (e.g., software or computer instructions executed by a processor or field programmable gate array (FPGA)).

Turning to FIG. 4, an example ladder diagram illustrating the manner in which an active and standby RP cards communicate when employing the HSNDP process will now be described. In this example, the active RP card 310 is symbolized by the thicker vertical black line on the left and the standby RP card 320 is symbolized by the thicker vertical black line on the right. At 410, keepalive messages are periodically sent back and forth between the active RP card 310 and the standby RP card 320, as shown.

It should be understood that any form of RP status detection may be implemented. For example, since both cards "know" that they are active and standby, then keepalive messages may only be sent from the active card to the standby card, and not necessarily in the opposite direction. The active and the standby RP cards may perform ND between themselves which may also serve as a form of keepalive message. In another example, the standby card can monitor the active card's network traffic to determine that the active card is still functioning.

At 420, on-demand HSNDP messages are sent from the active RP card 310 to the standby card 320 according to the HSNDP process 500. For example, when a Neighbor Advertisement (specified in RFC 4861) is processed by the active RP card, the RP may send a message to the standby RP card to update its Neighbor Cache. The messages are configured to allow the Neighbor Cache and FIB entries that are maintained by RP card 310 to be duplicated or otherwise synchronized in RP card 320. These messages will be described in greater detail below. At 430, the active RP card 310 fails as indicated by the horizontal dashed line. At 440, RP card 310 no longer sends keepalive messages while RP card 320 may continue to send any keepalive or other messages to RP card 310 until it recognizes that RP card 310 has failed.

At 450, the standby RP card 320 detects that the active RP card 310 has failed. In one example, if the standby RP card 320 does not receive the keepalive messages for a certain period of time, then standby RP card 320 initiates the process of becoming active, becomes active, and quickly begins to forward IPv6 traffic in place of RP card 310. One or more timers may be maintained for determining when to initiate failover, e.g., a software timer or a watchdog timer implemented as part of a real-time operating system (RTOS). In one example, the redundant system may maintain KEEPALIVE_INTERVAL and KEEPALIVE_TIMEOUT variables. The KEEPALIVE_INTERVAL is the time interval between successive keepalive messages and KEEPALIVE_TIMEOUT is the time period after which the standby node no longer considers that the active node is alive. In one example, when a timer exceeds the KEEPALIVE_TIMEOUT, then failover may be initiated by the standby card.

By virtue of the HSNDP process 500, RP card 320 is able to maintain neighbor state information and will not flush the Neighbor Cache. In this manner, RP card 320 is able to quickly assume the IPv6 duties for RP card 310. At 460, RP card 460 may optionally send HSNDP messages. The messages may be withheld pending a detection that RP card 310 has been repaired or replaced, or RP card 320 may send the messages to another (secondary) backup RP card.

Referring to FIG. 5, the HSNDP process 500 will now be described. At 510, a first network device is provisioned to actively process IPv6 traffic. At 520, a second network device is provisioned to act as a hot standby device for the first network device. In other words, IPv6 traffic is actively processed on a first network device for one or more neighbor devices while maintaining a second network device in a hot standby configuration for the first network device. At 530, HSNDP maintenance or synchronization messages are transmitted from the first network device to the second network device that are configured to indicate an IPv6 traffic processing state for the first network device. At 540, an IPv6 traffic processing state is updated in the second network device based on HSNDP messages such that the IPv6 traffic state in the second network device allows the second network device to timely process the IPv6 traffic upon RP card or node switchover from the first network device to the second network device.

The synchronization messages synchronize the states of each entry in the standby card cache with each entry in the active card cache. The format of an example synchronize message for the protocol is shown in FIG. 6. It should be noted that additional implementation-specific data may be included in the message specified in FIG. 6. When HSNDP is operating between two redundant routers, an authentication data field may be added to any control messages. The standby protocol runs on top of UDP and uses a port number to be assigned by the Internet Assigned Numbers Authority (IANA). In one example, packets are sent to the All-Routers on a link IPv6 multicast address of FF02::2. Within a router internal implementations may use any internal IP unicast or multicast communications. Also, different implementations may use different message formats.

In the example synchronization message shown in FIG. 6, the Action field allows for adding or creating, deleting, or replacing Neighbor Cache entries. These actions will be further described hereinafter. Other actions may be prescribed for the Action field. The Layer 2 ID field provides, e.g., a Service Identifier (SID) for a CM in a cable deployment or Line ID in Digital Subscriber Line (DSL) deployment. The Num(ber) of v6 addr field quantifies the number of IPv6 addresses included in the message. The IPv6 Address(es) field(s) is a list of IPv6 address(es) included in the message. The Link-layer address field provides a six byte link-layer address, e.g., the MAC address of a client device. In networks where the link-layer address is longer than six bytes, the format of the message changes to include more number of bytes for encoding the link-layer address.

As mentioned above, ND maintains a more complex or comprehensive state machine than does ARP. ND, per RFC 4861, maintains multiple states. The ND states are "-", INCOMPLETE, STALE, PROBE, DELAY and REACHABLE. Different timeouts and messages are also provided by ND, e.g., multicast Neighbor Solicitation (NS) and Neighbor Advertisement (NA), and unicast NS/NA for NUD for each of the states associated with each Neighbor Cache entry. NS messages are originated by nodes to request another node's link layer address, and for functions such as Duplicate Address Detection and NUD. NA messages are sent in response to NS messages. If a node changes its link-layer address, it can send an unsolicited NA to advertise the new address.

The "-" state is a beginning state for Neighbor Cache entry, i.e., before the entry state becomes truly stateful. In the INCOMPLETE state, address resolution is in progress and the link-layer address of the neighbor has not yet been determined. In the REACHABLE state, the neighbor is known to have been reachable recently, e.g., within tens of seconds ago. In the STALE state, the neighbor is no longer known to be reachable but until traffic is sent to the neighbor, no attempt is being made to verify its reachability. In the DELAY state, the neighbor is no longer known to be reachable, yet traffic has recently been sent to the neighbor. Rather than probe the neighbor immediately, however, probes are delayed for a short while. In the PROBE state the neighbor is no longer known to be reachable, and unicast NS probes are sent for a period of time to verify reachability.

When a standby node receives HSNDP synchronization messages, a new DEFERRED state is added in addition to the six states described above for ND. The DEFERRED state is used as a placeholder state for Neighbor Cache entry on the Standby Node (note that the standby node is not actively forwarding IPv6 packets, and hence, the node does not have any active FIB or ND operations). When an HSNDP synchronization add message is received on the standby node, the standby node creates a Neighbor Cache entry and places the entry in the DEFERRED state. When the DEFERRED entry is created on the Standby Node, the FIB, which contains the information necessary to forward a packet on the control and data planes, also has an entry created. An HSNDP replace message causes an existing DEFERRED state entry to be replaced by another DEFERRED state entry, and an HSNDP delete message causes an existing entry to be deleted.

Each active and standby node may maintain two internal data stores, one for the active Neighbor Cache and another for the deferred Neighbor Cache. When a standby node is BECOMING_ACTIVE, the deferred Neighbor Cache is switched to the active Neighbor Cache through simple and fast memory operations (e.g., a pointer swap). Such a switchover leads to a sub-three second ND HA recovery during an RP node switchover. In one example, when the standby node becomes an active node the DEFERRED entries in the deferred Neighbor Cache may be attached to the end of the active Neighbor Cache. By using this mechanism memory does not need to be allocated separately, saving time during the BECOMING_ACTIVE process.

On standby node switchover, i.e., STANDBY->ACTIVE, the standby node converts Neighbor Cache entries in the DEFERRED state to the REACHABLE state (note that in one embodiment, this state change could be indicated simply by the presence of the entry in an active Neighbor Cache with an attached stored state of REACHABLE). Once the entries are converted to REACHABLE, the previously standby, but now active, node will start forwarding IPv6 traffic. It is possible that some endpoints, e.g., CMs, or computers or network components behind the CMs within the customer premise will have been taken off line. To provide for this possibility the node may also initialize a REACHABLE_TIME ND timer for each Neighbor Cache entry as a maximum time for verifying the Neighbor Cache entries after failover. On active node switchover, ACTIVE->STANDBY, for a node that is still alive, the previously active but now standby node purges the active Neighbor Cache and begins to build a DEFERRED Neighbor Cache.

A state table is shown in table 1 below that illustrates possible state transitions for state machines on standby nodes that implement the DEFERRED state.

TABLE 1

Example ND state machine with a DEFERRED state

| State | Event | Action | New State |
|---|---|---|---|
| —, INCOMPLETE, STALE, PROBE, DELAY, REACHABLE | CM, CPE, int, routing peer adds or replaces entry | Sync msg to standby node | DEFERRED (on Standby) |

TABLE 1-continued

Example ND state machine with a DEFERRED state

| State | Event | Action | New State |
|---|---|---|---|
| —, INCOMPLETE, STALE, PROBE, DELAY, REACHABLE | CM, CPE, int, routing peer deletes entry | Sync msg to standby node | — (on Standby) |
| DEFERRED | BECOMING_ACTIVE | Swap active and deferred caches | REACHABLE |
| —, INCOMPLETE, STALE, PROBE, DELAY, REACHABLE | BECOMING_STANDBY | Swap caches and clear active cache | — |
| REACHABLE | timeout since reachable confirm | | STALE |
| STALE | sending packet | start delay timer | DELAY |
| DELAY | delay timeout | send N unicast NSs, start timer | PROBE |
| PROBE | too many retransmissions | discard entry | — |
| INCOMPLETE | Receive solicited NA | | REACHABLE |
| — | packet to send | send multicast NS/start timer | INCOMPLETE |

A further description of the ND state machine (for non-DEFERRED states) can be found in Appendix C of RFC 4861.

To further illustrate state changes in response to network events it is useful to provide the event definitions described below:

CM online: CM is operational with IPv6 address(es) and ready to forward IPv6 packets.

CPE online: CPE has complete IPv6 address acquisition.

CM deleted: the CM is removed from the CMTS or CMTS interface via CLI or any other means like a data link layer timeout.

CPE deleted: the CPE is removed from the CMTS or CMTS interface via CLI or any other means like an NUD timeout.

Network interface acq, replace addr: any network interfaces completes IPv6 address acquisition.

Network interface del addr: any network interface relinquishes its IPv6 addresses.

Routing peer add, replace Neighbor Cache: Routing protocols such as Open Shortest Path First (OSPFv3) and Intermediate System-Intermediate System (ISIS) for IPv6 will add an IPv6 address of the neighbor routing peers to the Neighbor Cache.

Routing peer del(ete) Neighbor Cache: Routing protocols such as OSPFv3 and ISIS for IPv6 or NUD timeout cause deletion an IPv6 address of the neighbor routing peers from the Neighbor Cache.

Other entry add, replace Neighbor Cache: such as privacy addresses, which are valid for the length of time of a Transmission Control Protocol (TCP) session.

Other entry del(ete) Neighbor Cache: such as privacy addresses, which are valid for the length of time of a TCP session.

RP switchover: When an Active Node, e.g., interface RP-A or router-A, goes down and the Standby Node, e.g., interface RP-B or router-B, is taking over for data forwarding.

RP revert: The interface RP-B (or router-B) switches back to the interface RP-A (or router-A) so that RP-A (or router-A) is now the Active Node.

State change responses to support the HSNDP for all neighbors on the redundant system are shown in table 2 below. In the table below "RP switchover" can be either RP interface switching over in a router or a router taking over from another router.

TABLE 2

Standby node state responses to network events

| Event | Action | New State |
|---|---|---|
| CM online | Create or Replace DEFERRED entry on Standby | DEFERRED |
| CPE online | Create or Replace DEFERRED entry on Standby | DEFERRED |
| CM deleted | Delete DEFERRED entry on Standby | — |
| CPE deleted | Delete DEFERRED entry on Standby | — |
| Network interface acq addr | Create or Replace DEFERRED entry on Standby | DEFERRED |
| Network interface del addr | Delete DEFERRED entry on Standby | — |
| Routing peer add Neighbor Cache | Create or Replace DEFERRED entry on Standby | DEFERRED |
| Routing peer del Neighbor Cache | Delete DEFERRED entry on Standby | — |
| Other entry add Neighbor Cache | Create or Replace DEFERRED entry on Standby | DEFERRED |
| Other entry del Neighbor Cache | Delete DEFERRED entry on Standby | — |

TABLE 2-continued

Standby node state responses to network events

| Event | Action | New State |
|---|---|---|
| RP switchover | Convert DEFERRED entries to REACHABLE on Standby, start ND timers | STANDBY -> ACTIVE, ACTIVE -> STANDBY |
| RP revert | Convert DEFERRED entries to REACHABLE on Standby, start ND timers | STANDBY -> ACTIVE, ACTIVE -> STANDBY |

The event, action, and state entries in table 2 are self-explanatory and will not be further described.

Although the techniques described herein have been described with specific examples relative to cable systems with a brief mention of other general networking environments, HSNDP fits solutions to ND HA in various data forwarding router architectures like Distributed FIB (DFIB) and Locator/ID Separation Protocol (LISP, draft-ietf-lisp-09) routed deployment. In LISP, the routing table is moved from a router to a remote machine.

Techniques have been described herein for receiving synchronization messages at a second network device that is in a hot standby configuration from a first network device that is maintaining Internet Protocol version 6 (IPv6) state machines for one or more neighbor devices. The synchronization messages are configured to indicate an IPv6 state for each state machine maintained in the first network device. An IPv6 state for corresponding state machines is updated in the second network device based on the synchronization messages such that the IPv6 states in the second network device allows the second network device to actively process IPv6 traffic for the one or more neighbor devices upon traffic switchover from the first network device to the second network device without restarting the corresponding IPv6 state machine associated with each of the one or more neighbor devices in the second network device. Updating traffic states may comprise adding, replacing, or deleting entries in a Neighbor Cache, where each entry indicates an IPv6 traffic processing state associated with each IPv6 traffic processing state machine.

The roles of the first and second network device with respect to active and standby state are reversed after a switchover. Techniques are also described herein for the second network device to transmit synchronization messages to the first network device, whereby the first network device synchronizes an IPv6 traffic processing state with the second network device in a similar manner to that described above.

A new state is set in each state machine that is configured to allow the first network device to convert the new state to a state that actively processes the IPv6 traffic upon switchover. Each state machine is an ND state machine associated with the IPv6 ND protocol and the new state is a DEFERRED state which is converted to an ND REACHABLE state upon switchover without using an intermediate ND state. The DEFERRED state in each state machine is converted to an ND REACHABLE state upon switchover.

In summary, the HSNDP process provides a protocol and state machine for router to router redundancy or RP to RP card redundancy within a router for IPv6 ND protocol HA. The HSNDP protocol recovers Neighbor Cache data in less than three seconds.

From the foregoing description, it will be appreciated that embodiments described herein make available a novel method, apparatus, and software or firmware product for the Hot Standby Neighbor Discovery Protocol for IPv6, wherein a system and method enable a cable system operator or network operator in cable system and general networking environments to reduce networking component failover times with respect to IPv6.

Having described preferred embodiments of a new Hot Standby Neighbor Discovery Protocol for IPv6, it is believed that other modifications, variations and changes will be suggested to those skilled in the art in view of the teachings set forth herein. It is therefore to be understood that all such variations, modifications and changes are believed to fall within the scope of the techniques described herein as defined by the appended claims.

What is claimed is:

1. A method comprising:
at a second network device in a hot standby configuration, receiving synchronization messages from a first network device that is maintaining Internet Protocol version 6 (IPv6) Neighbor Discovery (ND) state machines for one or more neighbor devices, wherein each of the IPv6 ND state machines comprises an IPv6 Neighbor Discovery (ND) state machine associated with the IPv6 ND protocol configured to indicate a reachability state for corresponding IPV6 connections and wherein the synchronization messages are configured to indicate an IPv6 ND state for each an IPv6 state machine maintained in the first network device;
updating an IPv6 ND state for corresponding an IPv6 state machines in the second network device based on the synchronization messages; and
setting a deferred state in a corresponding IPv6 state machine that is configured to allow the second network device to convert the deferred state to an IPv6 ND reachable state upon IPv6 traffic switchover from the first network device to the second network device without restarting the corresponding IPv6 ND state machine associated with each of the one or more neighbor devices in the second network device.

2. The method of claim 1, wherein updating comprises adding, replacing, or deleting an entry in a Neighbor Cache, wherein each entry in the Neighbor Cache indicates an IPv6 ND state associated with each IPv6 ND state machine.

3. The method of claim 1, wherein switchover occurs in response to the second network device detecting a failure in the first network device or by an external command.

4. The method of claim 1, further comprising transmitting synchronization messages from the first network device to the second network device or another network device that are configured to indicate IPv6 ND states for an IPv6 state machine associated with the first network device.

5. The method of claim 1, further comprising processing the IPv6 traffic at the second network device in less than three seconds after switchover.

6. A method comprising:
at a first network device, processing Internet Protocol version 6 (IPv6) traffic for one or more neighbor devices;
maintaining an IPv6 Neighbor Discovery (ND) state machine for each of the one or more neighbor devices that configured to indicate an IPv6 ND state for a corresponding neighbor device, wherein each of the an IPv6 state machines comprises an IPv6 ND state machine associated with the IPv6 ND protocol configured to indicate a reachability state for corresponding IPV6 connections;

generating synchronization messages that are configured to indicate the IPv6 ND states for each of the IPv6 ND state machines; and transmitting the synchronization messages to a second network device that is in a hot standby configuration as a backup for the first network device such that synchronization messages received by the second network device cause a corresponding IPv6 ND state machine to be maintained in the second network device for each of one or more neighbor devices, and to set a deferred state for corresponding IPv6 ND state machines configured to allow the second network device to convert the deferred state to an IPv6 ND reachability state upon IPv6 traffic switchover from the first network device to the second network device without restarting the corresponding IPv6 ND state machines associated with each of the one or more neighbor devices in the second network device.

7. The method of claim 6, further comprising:

switching over IPv6 traffic processing from the first network device to the second network device;

configuring the first network device to be a hot standby configuration as a backup for the second network device;

at the first network device, receiving synchronization messages from the second network device that are configured to indicate the IPv6 ND state for each IPv6 ND state machine maintained in the second network device;

updating an IPv6 ND state for corresponding IPv6 ND state machines in the first network device based on the synchronization messages; and when a given synchronization message comprises an IPv6 ND state that indicates ND reachability for a corresponding neighbor device, setting a deferred state in a corresponding IPv6 ND state machine in the first network device that is configured to allow the second network device to convert the deferred state to an IPv6 ND reachability state upon IPv6 traffic switchover from the second network device to the first network device without restarting the corresponding IPv6 ND state machine associated with each of the one or more neighbor devices in the first network device.

8. The method of claim 7, wherein updating comprises adding, replacing, or deleting an entry in a Neighbor Cache, wherein each entry in the Neighbor Cache indicates an IPv6 ND state associated with each corresponding IPv6 ND state machine.

9. An apparatus comprising:

one or more network interfaces configured to transmit and receive Internet Protocol version 6 (IPv6) traffic and synchronization messages; and a processor configured to:

process received synchronization messages from a network device that is maintaining IPv6 Neighbor Discovery (ND) state machines for one or more neighbor devices, wherein each of the IPv6 ND state machines comprises IPv6 ND state machine associated with the IPv6 ND protocol configured to indicate a reachability state for corresponding IPV6 connections and wherein the synchronization messages are configured to indicate an IPv6 ND state for each IPv6 ND state machine associated with the one or more neighbor devices maintained in the network device;

configure the apparatus to be in a hot standby configuration for the network device and configure the apparatus to be in an active configuration upon IPv6 traffic switchover from the network device to the apparatus;

update an IPv6 ND state for corresponding IPv6 ND state machines in the apparatus that are associated with each of the one or more neighbor devices based on the synchronization messages; and set a deferred state in a corresponding IPv6 ND state machine that is configured to allow the network device to convert the deferred state to an IPv6 ND reachability state upon IPv6 traffic switchover from the network device to the apparatus without restarting the corresponding IPv6 ND state machines.

10. The apparatus of claim 9, wherein the processor is configured to update by adding, replacing, or deleting an entry in a Neighbor Cache, wherein each entry in the Neighbor Cache indicates an IPv6 ND state associated with each IPv6 ND state machine.

11. The apparatus of claim 9, wherein the processor is further configured to switchover in response to detecting failure in the network device or by an external command.

12. The apparatus of claim 9, wherein the processor is further configured to transmit synchronization messages to the network device or another network device that are configured to indicate an IPv6 ND states for locally maintained IPv6 ND state machines.

13. The apparatus of claim 9, wherein the processor is further configured to process the IPv6 traffic in less than three seconds after switchover.

14. An apparatus comprising:

one or more network interfaces configured to transmit and receive Internet Protocol version 6 (IPv6) traffic and synchronization messages; and a processor configured to:

process IPv6 traffic for one or more neighbor devices;

maintain an IPv6 Neighbor Discovery (ND) state machine for each of the one or more neighbor devices that is configured to indicate an IPv6 ND state for a corresponding neighbor device, wherein each of the IPv6 ND state machines comprises IPv6 ND state machine associated with the IPv6 ND protocol configured to indicate a reachability state for corresponding IPV6 connections;

generate synchronization messages that are configured to indicate the IPv6 ND states for each of the IPv6 ND state machines; and transmit the synchronization messages to a network device that is in a hot standby configuration as a backup for the apparatus such that synchronization messages received by the network device cause a corresponding IPv6 ND state machine to be maintained in the network device for each of one or more neighbor devices, and to set a deferred state for corresponding IPv6 ND state machines configured to allow the network device to convert the deferred state to an IPv6 ND reachability state upon IPv6 traffic switchover from the apparatus to the network device without restarting the corresponding IPv6 ND state machines associated with each of the one or more neighbor devices in the network device.

15. The apparatus of claim 14, wherein the processor is further configured to:

switch IPv6 traffic processing from the apparatus to the network device;

configure the apparatus to be a hot standby configuration as a backup for the network device;

receive synchronization messages from the network device that are configured to indicate the IPv6 ND state for each IPv6 ND state machine maintained in the network device;

update an IPv6 ND state for corresponding IPv6 ND state machines in the apparatus based on the synchronization messages; and
set a deferred state in a corresponding IPv6 ND state machine that is configured to allow the apparatus to convert the deferred state to an IPv6 ND reachability state upon IPv6 traffic switchover from the network device to the apparatus without restarting the corresponding IPv6 ND state machine associated with each of the one or more neighbor devices in the apparatus.

16. The apparatus of claim 15, wherein the processor is configured to update by adding, replacing, or deleting an entry in a Neighbor Cache, wherein each entry in the Neighbor Cache indicates an IPv6 ND state associated with each corresponding IPv6 ND state machine in the network device.

17. A system comprising the apparatus of claim 9 and the network device, the network device comprising:
one or more network interfaces configured to transmit and receive IPv6 traffic and synchronization messages; and
a processor configured to:
process IPv6 traffic for one or more neighbor devices;
maintain an IPv6 ND state machine for each of the one or more neighbor devices that is configured to indicate an IPv6 ND state for a corresponding neighbor device, wherein each of the IPv6 ND state machines comprises IPv6 ND state machine associated with the IPv6 ND protocol configured to indicate a reachability state for corresponding IPV6 connections;
generate synchronization messages that are configured to indicate the IPv6 ND states for each of the IPv6 ND state machines; and
transmit the synchronization messages to the apparatus that is in a hot standby configuration as a backup for the network device such that synchronization messages received by the apparatus cause a corresponding IPv6 ND state machine to be maintained in the apparatus for each of one or more neighbor devices, and to set a deferred state for corresponding IPv6 ND state machines configured to allow the network device to convert the deferred state to an IPv6 ND reachability state upon IPv6 traffic switchover from the network device to the apparatus without restarting the corresponding IPv6 ND state machines associated with each of the one or more neighbor devices in the apparatus.

* * * * *